Nov. 6, 1928.
E. C. SASNETT
1,690,460
RAILWAY SIGNALING
Filed Oct. 9, 1925
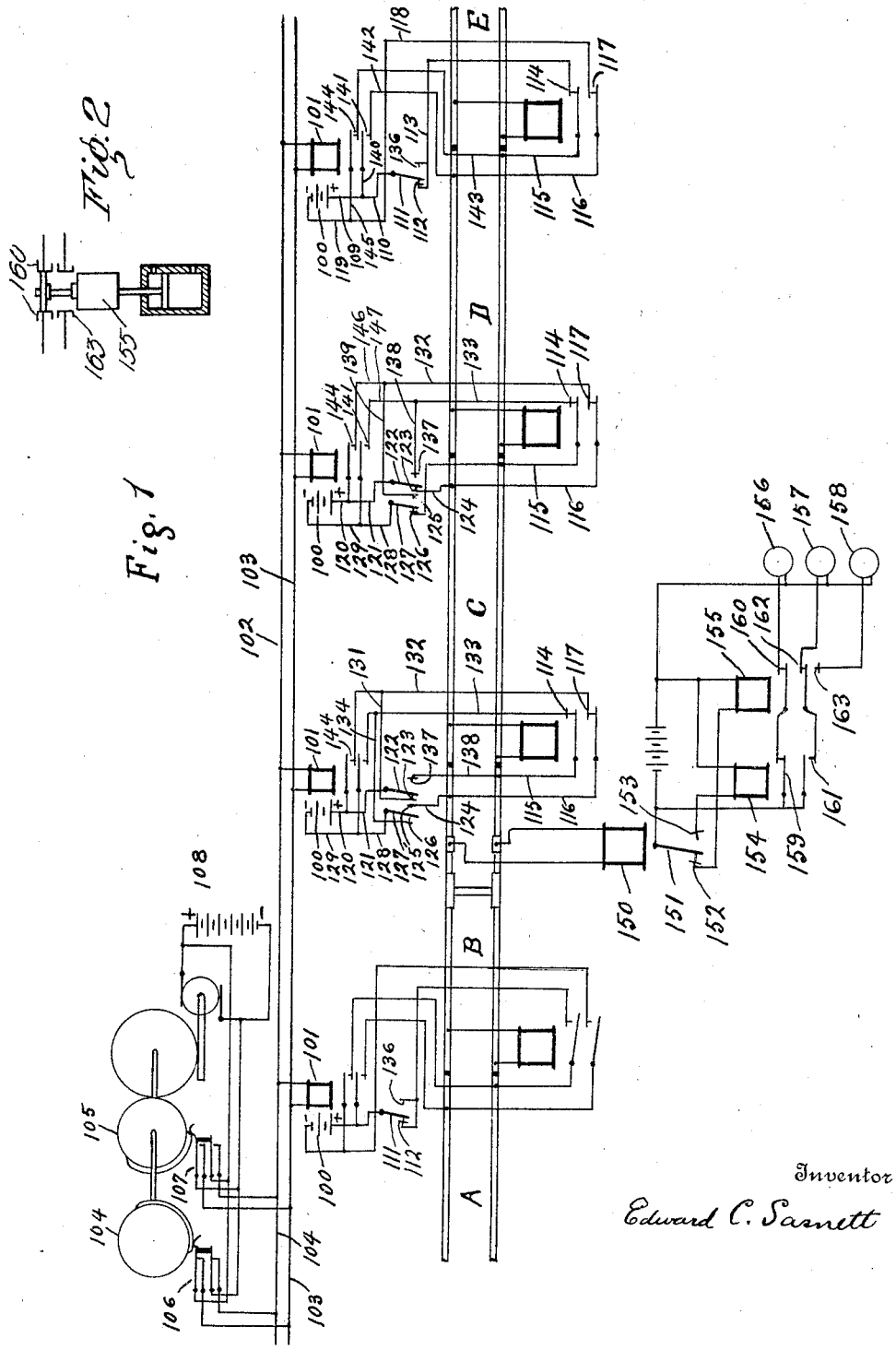
Inventor
Edward C. Sasnett Patented Nov. 6, 1928.

1,690,460

UNITED STATES PATENT OFFICE.

EDWARD C. SASNETT, OF WASHINGTON, DISTRICT OF COLUMBIA.

RAILWAY SIGNALING.

Application filed October 9, 1925. Serial No. 61,425.

The present invention relates to railway signaling, and particularly to normal safety signaling systems of the direct current type.

The novel features of the invention will be pointed out in the claims.

Fig. 1 shows in a diagrammatic way one system embodying the invention.

Fig. 2 is a detail view illustrating a slow-acting relay.

Fig. 1 of the drawing shows a stretch of track divided into insulated blocks A, B, C, D, E etc. having a track relay connected at the entrance end of each block and a battery 100 adapted to be connected to the exit end. Relays 101 having neutral and polarized contacts are associated with the track relays and connected across line wires 102 and 103 leading to a central station. At this central station there are two uniformly driven cams 104 and 105 operating circuit controllers 106 and 107, respectively. The raised part of each cam extends through an arc of 120° and are arranged so that when one raised portion passes out of engagement with its circuit controller the other raised portion simultaneously engages its circuit controller. The circuit controllers when closed connect a battery 108 across the line wires 102 and 103. When circuit controller 106 is closed the positive pole of battery 108 is connected to line wire 103, and when circuit controller 107 is closed the positive pole of the battery is connected to line wire 104. If it be assumed that the cams make a complete revolution every three seconds, battery 108 will be connected across the line wires for a period of one second, say by switch 106; then connected by switch 107 across the line wires with reversed polarity for a period of one second; and finally disconnected for a period of one second; for each cycle or revolution of the cams.

With switch 106 closed as shown, the back neutral contacts of relays 101 are open and the polarized contacts of these relays are in their left hand positions. Under these conditions, current from the battery 100 associated with the track relay connected to block E flows in the rails of block D by way of the following connections: positive way of the following connections: positive pole of the battery, conductors 109 and 110, polarized contacts 111 and 112, conductor 113, front contact 114 of the relay connected to block E, conductor 115, the lower rail of block D, the track relay, the upper rail of block D, conductor 116, front contact 117, and conductors 118 and 119 to the negative pole of battery 100. Current flows in the rails of block C by way of the following connections: from the positive pole of the battery 100 associated with the track relay of block D, conductors 120 and 121, contacts 122, 123, conductor 124, the upper rail of block C, the track relay and the lower rail, conductor 125, contacts 126, 127, and conductors 128, 129 to the negative pole of the battery. Current flows in the rails of block B by way of the following connections: positive pole of the battery 100 associated with the track relay connected to block C, conductors 120, 121, contacts 122, 123, conductors 131, 132, front contact 117 of the track relay, conductor 116, the upper rail of block B, the track relay, the lower rail, conductor 115, front contact 114, conductors 133, 134, contacts 126, 127, and conductors 128 and 129 to the negative pole of the battery. Current flows in the rails of block A by way of the same connections as those described with respect to block D.

It may be here pointed out that the block stations are arranged in groups of three and that the connections at stations in the same group are different while the connections at corresponding stations of the several groups are the same. The stations for blocks B, C and D belong to the same group while the station for block E belongs to the next group and is the first station thereof. The connections for the station for block F (not shown) are the same as the connections for the station for block C; and the connections of the station for block G (not shown) are the same as those for the station of block D.

When switch 107 closes simultaneously with the opening of switch 106 the direction of current in the line wires 102 and 103 is reversed and the polarized contacts of relays 101 move to their right hand positions while the back contacts remain open. Current now flows through the rails of block D by way of the connections formerly described, except that the circuit is closed through contacts 111 and 136 instead of through contacts 111 and 112. Current flows through the rails of block C by way of the following connections: positive pole of battery 100, conductors 120 and 121, contacts 122 and 137, conductor 138, conductor 133, front contact 114, conductor 115, the lower rail of block C, the track relay, the upper rail, conductor 116, front contact 117, conductors 132 and 139, contacts 125 and 127, and conductors 128 and 129 to the negative pole of the battery. Current flows through the rails of block B by way of the following connections: battery 100, conductors 120 and 121, contacts 122 and 137, conductor 138, the lower rail of block B, the track relay, the upper rail, conductor 124, contacts 125', 127, and conductors 128 and 129 to the negative pole of the battery. Current flows in the rails of block A by way of the same connections as those described with respect to block D. When the switch 107 opens, there is an interval (while the cams are rotating through an angle of 120°) when current is cut off from the line wires 102 and 103.

During the interval in which current is cut off from line wires 102 and 103, the back neutral contacts of relays 101 are closed, and the polarized contacts 122, 127 and 111 occupy their neutral or middle positions, in which they do not engage any of the stationary contacts. In this interval therefore current flows through the rails of block D by way of the following connections: positive pole of battery 100, conductors 109, 140, back contact 141, conductor 142, the upper rail of block D, the track relay, the lower rail, conductor 143, back contact 144 and conductors 145 and 119 to the negative pole of the battery. Current flows in the rails of block C through the following connections: positive pole of battery 100, conductor 120, back contact 144, conductors 146, 132, front contact 117, conductor 116, the upper rail of block C, the track relay, the lower rail, conductor 115, front contact 114, conductors 133, 147, back contact 141 and conductor 129 to the negative pole of the battery. Current flows in the rails of block B by way of connections in all respects similar to those described with reference to block C, and current flows in block A by way of connections similar to those described in the case of block D.

It will be understood from the foregoing that current continuously flows through the track rails under normal or safe conditions. However, it is to be observed that this current does not flow through the rails at all times in the same direction. Take block D, for example; when switch 106 is closed the positive pole of battery 100 is connected to the lower rail through contacts 111 and 112 of relay 101 and through the front contact 114 of the track relay; when switch 107 is closed the positive pole of the battery is also connected to the lower rail through contacts 111 and 136 of relay 101 and front contact 114 of the track relay. But when current is cut off from the line wires the positive pole of the battery is connected to the upper rail of block D through back contact 141 of relay 101. Thus with the assumption that the cams make a complete revolution every three seconds, current will flow in the rails of block D in one direction for a period of two seconds through the polarized contacts of relay 101 and for a period of one second through the back neutral contacts of this relay. Again, take the case of block C: when switch 106 is closed the positive pole of battery 100 is connected to the upper rail of block C through the polarized contacts 122 and 123. When switch 107 is closed the positive pole of the battery is connected to the lower rail through polarized contacts 122 and 137 and front contact 114 of the track relay connected to block D; and when current is cut off from the line wires, the positive pole of the battery is connected to the upper rail of block C through back contact 144 and front contact 117. Thus also in the case of block C, there will be a flow of current through the rails in one direction for a period of two seconds and a flow in the opposite direction for a period of one second. Finally, take the case of block B: When switch 106 is closed, the positive pole of the battery is connected to the upper rail of block B through the contacts 122 and 123 of relay 101 and the front contact 117 of the track relay. When switch 107 is closed the positive pole of the battery is connected to the lower rail through contacts 122 and 137 of relay 101. When current is cut off from the line wires, the positive pole of the battery is connected to the upper rail of block B through back contact 144 of relay 101 and front contact 117 of the track relay. Here again, there will be a flow of current through the rails in one direction for a period of two seconds and a flow in the opposite direction for a period of one second. It will be clear therefore that under normal conditions current flows through the rails of the blocks first for two seconds in one direction and then for one second in the other direction every three seconds.

Consider now the conditions obtaining when a track relay is deenergized. Assume the track relay connected to block E to be deenergized. During the two second period when switches 106 and 107 are closed, there will be no flow of current in the rails of block D, for the reason that the track circuit connections through contacts 111, 112 and 136 are open at the front contact 114. During the one second period when current is cut off from the line wires, however, there will be a flow of current in the rails of block D through the back contacts 144 and 141, the positive pole of the battery being connected to the upper rail of block D. During this one second interval therefore current will also flow through the rails of block C through the back contacts 144 and 141 of relay 101 and the front contacts 114 and 117 of the track relay, the positive pole of the battery being connected to the upper rail. During this one second period when current is cut off from the line wires, current will flow through the rails of block B by way of the back contacts of relay 101 and the front contacts of the track relay, the positive pole of the battery being connected to the upper rail. Current will also flow in the rails of block A by connections similar in all respects to those for block D. At the end of the one second period in which current is cut off from the line wires, switch 106 closes and the polarized contacts of relays 101 move to their left hand position. Therefore during the one second interval in which switch 106 is closed no current flows in the rails of block D. Current flows through the rails of block C through the contacts 122, 123 and 127, 126 of relay 101, the positive pole of the battery being connected to the upper rail. Current flows through the rails of block B through the contacts 122, 123 and 126, 127 of relay 101 and through the front contacts 114 and 117 of the track relay. Current flows through the rails of block A by way of contacts 111 and 112 and the front contacts of the track relay. At the end of the one second period in which current is connected to the line wires through switch 106, switch 107 closes and the polarized contacts of relays 101 move to their right hand positions. During this period, no current will flow through the rails of block D since the connection through the polarized contacts of relay 101 is open at front contact 114 of the track relay. Also during this interval no current will flow through the rails of block C, as the connections through contacts 125' and 137 are open at the front contacts 114 and 117 of the track relay. During this interval current will flow through the rails of block B by way of the contacts 125' and 137.

Fig. 2 shows a type of slow acting relay which may be employed in the system. As shown, this relay comprises a solenoid having a plunger connected at one end to a piston operating in a dash pot and connected at its other end to a bridge piece which when the solenoid is energized bridges the front contacts 160 and when the solenoid is deenergized bridges the back contacts 163. As long as the solenoid is energized periodically for a period of two seconds and deenergized for a period of one second, contacts 160 will be bridged, but when the solenoid is periodically energized for a period of only one second and deenergized for a period of two seconds the bridge member will maintain an engagement with back contacts 163.

From the above it will be understood, that when a track relay is deenergized, current will flow through the rails of the block immediately in rear for a period of one second every three seconds of, say, positive polarity; in the second block in rear current of the same polarity will flow for a period of two seconds every three seconds; and in the third block in rear current will flow of the same polarity for a period of two seconds and current of negative polarity will flow for a period of one second. That is, in the third block in rear of an occupied block normal conditions obtain, current continuously flowing in the rails but reversing in polarity twice every three seconds.

Any suitable signaling mechanism either on the track or on the cab of a locomotive or on both may be provided to respond selectively to the character of current flowing in the track rails. As illustrated, a cab signaling device is provided comprising a polarized relay 150 connected by a low resistance circuit to contacts engaging the rails. Under normal or safe conditions, the polarized armature 151 of this relay vibrates in unison with the reversals of current in the rails, alternately engaging stationary contacts 152 and 153 and thereby alternately closing the circuits of relays 154 and 155 which control the circuits of clear, caution and danger lamps 156, 157 and 158, respectively. The relays 154 and 155 are slow acting relays and accordingly hold up their armatures so long as the interval between successive energizations thereof does not substantially exceed two seconds. Therefore under clear conditions the circuit of clear lamp 156 will be completed through the front contacts 159 and 160. Under caution conditions, armature contact 151 moves from a central neutral position into engagement with stationary contact 152 and maintains such engagement for a period of two seconds, then moves back to its central position wherein it remains for a period of one second and then again moves into engagement with contact 152. Hence the circuit of relay 155 will be intermittently closed so as to hold this relay up, but the circuit of relay 154 will not be closed and hence this relay will drop. Under caution conditions therefore the circuit of clear lamp 156 will be interrupted at front contact 159 and the circuit of caution lamp 157 will be closed at back contact 161 and front contact 162. Under danger conditions, the polarized contact 151 will remain in its open position for a period of two seconds and will be engaged with contact 152 for a period of one second every three seconds. Relay 155 is constructed such that when it is deenergized for period of two seconds it will open its front contacts and close its back contacts and will not open its back contact when energized for a period of only one second. Hence this relay will drop and remain dropped when intermittently energized for only one second during three second periods. Any suitable known device, such as a dash pot may be provided to effect this result. Hence under danger conditions the circuit of caution lamp is open at front contact 162, and the circuit of danger lamp 158 is closed at back contacts 161 and 163.

I claim:

1. A railway signaling system comprising a track divided into insulated blocks, track relays connected across the rails at the entrance ends of the blocks, local sources of direct current adapted to be connected across the rails at the exit ends of the blocks through connections controlled by said track relays, selective means operated from a central station controlling said connections for periodically reversing said connections, a vehicle traveling on the track having a polarized relay connected across the track rails and train governing mechanism controlled by said relay.

2. A railway signaling system comprising a track divided into blocks, a track relay connected across the rails at the entrance end of each block, constantly operating synchronized devices associated with the track relays and operating jointly therewith to connect local sources of direct current across the rails at the exit ends of the blocks and to reverse periodically the connections of said sources to the rails and train control devices responsive to the currents flowing through the rails.

3. A railway signaling system comprising a track divided into blocks, a track relay connected across the rails at the entrance end of each block, synchronized devices associated with the track relays and operating jointly therewith to connect local sources of direct current across the rails at the exit ends of the blocks and to reverse periodically the connections of said sources to the rails, a vehicle traveling on the track having a polarized relay connected across the track rails and train control devices governed by said polarized relay.

4. A railway signaling system comprising a track divided into blocks, a track relay connected across the rails at the entrance end of each block, continuously operating synchronized devices, associated with the track relays and operating jointly therewith to connect local sources of electrical energy across the track rails at the exit ends of the blocks and to periodically vary the characteristics of said energy and train control mechanism selectively responsive to the character of energy flowing through the track rails.

5. A railway signaling system comprising a track divided into blocks, a track relay connected across the rails at the entrance end of each block, continuously operating synchronized devices, associated with the track relays and operating jointly therewith to connect electrical energy across the rails at the exit ends of the blocks and to periodically vary the characteristics of said energy and train control mechanism selectively responsive to the character of energy flowing through the track rails.

6. A railway traffic controlling system comprising in combination, a track divided into insulated blocks, a normally energized track relay connected across the rails of each block, means operating when a track relay is deenergized to apply currents of different characteristics respectively to the two blocks immediately in rear of said deenergized relay and to apply current of said two characteristics alternately and periodically to the third block in rear, and signals for the blocks selectively controlled by said currents.

7. A railway traffic controlling system comprising in combination, timing means for alternately applying to the rails of each block currents of different characteristics, a track relay for each block continuously energized by said currents, said timing means operating when a track relay is deenergized to apply current of one characteristic to the block immediately in rear of the deenergized relay and current having another characteristic to the second block in rear, and signals for the blocks selectively controlled by said currents.

8. A railway traffic controlling system comprising in combination, a track divided into insulated blocks, a track relay connected across the rails of each block, timing means controlled by the track relays for continuously applying current to the rails of the blocks under normal conditions, said means operating when a relay is deenergized to apply current intermittently to the rails of a block in the rear, clear signals for the blocks displayed only while current is continuously applied to the rails, and caution signals displayed while current is intermittently applied.

9. A railway traffic controlling system comprising in combination, a conductor divided into insulated sections, means for successively and periodically applying electrical energy of two different characters to the sections of said conductor under clear traffic conditions, means for intermittently applying current to said sections of one of said characters under caution conditions and of the other character under danger conditions, a vehicle having a translating device electrically connected to said conductor, and signals actuated by said translating device selectively according to the character of current received.

In testimony whereof I hereunto affix my signature.

EDWARD C. SASNETT.